(12) United States Patent
Dobryniewski (10) Patent No.: US 11,221,758 B2
(45) Date of Patent: Jan. 11, 2022

(54) METHOD FOR ALLOWING QUICKER CHARACTER ENTRIES USING A VIRTUAL KEYBOARD CONTROLLED WITH A CONTROLLER HAVING A REDUCED NUMBER OF KEYS

(71) Applicant: ADVANCED DIGITAL BROADCAST S. A., Bellevue (CH)

(72) Inventor: Jacek Dobryniewski, Zielona Gora (PL)

(73) Assignee: ADVANCED DIGITAL BROADCAST S.A., Bellevue (CH)

( * ) Notice: Subject to any disclaimer, the term of this patent is extended or adjusted under 35 U.S.C. 154(b) by 21 days.

(21) Appl. No.: 16/423,198

(22) Filed: May 28, 2019

(65) Prior Publication Data

US 2019/0369869 A1 Dec. 5, 2019

(30) Foreign Application Priority Data

May 29, 2018 (EP) .................................... 18174753

(51) Int. Cl.
| | | |
|---|---|---|
| *G06F 3/048* | (2013.01) | |
| *H04N 21/43* | (2011.01) | |
| *G06F 3/0488* | (2013.01) | |
| *G06F 3/0481* | (2013.01) | |
| *H04N 21/431* | (2011.01) | |

(52) U.S. Cl.
CPC ...... *G06F 3/04886* (2013.01); *G06F 3/04817* (2013.01); *H04N 21/4312* (2013.01)

(58) Field of Classification Search
CPC ... G06F 3/00; G06F 3/02; G06F 3/048; G06F 3/04886; G06F 3/04817; G06F 3/041; H04N 21/42204; H04N 21/42214; H04N 21/4312
See application file for complete search history.

(56) References Cited

U.S. PATENT DOCUMENTS

| | | | | |
|---|---|---|---|---|
| 2004/0104896 | A1* | 6/2004 | Suraqui ................. | G06F 3/0237 345/168 |
| 2007/0296704 | A1* | 12/2007 | Park ...................... | G06F 3/0362 345/169 |
| 2008/0284782 | A1* | 11/2008 | Englerth ............... | G06F 3/0236 345/468 |
| 2012/0050192 | A1* | 3/2012 | Kobayashi ............ | G06F 3/0488 345/173 |
| 2014/0092021 | A1* | 4/2014 | Foote ............... | H04N 21/42214 345/169 |

(Continued)

*Primary Examiner* — Hugo Molina
(74) *Attorney, Agent, or Firm* — Mark M. Friedman (57) ABSTRACT

Method for a virtual keyboard, the method being characterized in that it comprises the steps of: defining (301) at least one geometric shape; placing (302), along the outline of the geometric shape, a plurality of character icons corresponding to alphanumeric characters; generating (303), at least one line, crossing said geometric shape, and having at least two crossing points with said at least one geometric shape and with two of its character icons per line, which are thereby designated as currently highlighted character icons; assigning (304) said two character icons to two distinct keys on a controller (200); automatically, successively (305) highlighting pairs of said character icons; awaiting (306) a user input designating either of the two character icons currently highlighted.

13 Claims, 13 Drawing Sheets

(56) References Cited

U.S. PATENT DOCUMENTS

| | | | |
|---|---|---|---|
| 2014/0181750 A1* | 6/2014 | Fujiwara | G06F 3/04886 |
| | | | 715/835 |
| 2016/0328141 A1* | 11/2016 | Fan | G06F 3/04886 |
| 2017/0109016 A1* | 4/2017 | Hachiya | G06F 3/04883 |
| 2018/0024597 A1* | 1/2018 | Lindemann | G06F 1/1698 |
| | | | 345/157 |
| 2018/0248990 A1* | 8/2018 | Jung | G06F 3/0236 |

* cited by examiner

METHOD FOR ALLOWING QUICKER CHARACTER ENTRIES USING A VIRTUAL KEYBOARD CONTROLLED WITH A CONTROLLER HAVING A REDUCED NUMBER OF KEYS

TECHNICAL FIELD

The present invention relates to a system and method for a virtual keyboard. In particular the present invention relates to a method for allowing quicker character entries using a virtual keyboard controlled with a controller having a reduced number of keys.

BACKGROUND OF THE INVENTION

Virtual keyboards are becoming very common in electronic devices mainly because of the growing number of devices such as mobile phones, portable cameras, portable navigation devices. Still virtual keyboards are one of the most primitive mechanisms for entering alphanumeric characters.

Text entry is in virtual keyboards much slower than entering information using physical keyboards. Especially in case of game controllers or television remote controllers, which have a reduced number of keys, text input is very slow. It typically requires pressing directional keys many times in order to reach and select a desired letter and such pattern is executed for every character to be input.

Therefore, there exists a need to improve typing performance of virtual keyboards, especially those operated without a use of a cursor operated by a mouse, a trackball or a touch interface.

The aim of the development of the present invention is an improved system and method for a virtual keyboard allowing quicker text entry.

SUMMARY AND OBJECTS OF THE PRESENT INVENTION

An object of the present invention is a method for a virtual keyboard, the method being characterized in that it comprises the steps of: defining at least one geometric shape; placing, along the outline of the geometric shape, a plurality of character icons corresponding to alphanumeric characters; generating, at least one line, crossing said geometric shape, and having at least two crossing points with said at least one geometric shape and with two of its character icons per line, which are thereby designated as currently highlighted character icons; assigning said two character icons to two distinct keys on a controller; automatically, successively highlighting pairs of said character icons; awaiting a user input designating either of the two character icons currently highlighted.

Preferably, said geometric shape is present in the final output image.

Preferably, said geometric shape is a closed geometric shape, which is a space that is totally enclosed by lines, or unbroken contours.

Preferably, the closed geometric shape is a convex polygon or a circle or an ellipse.

Preferably, there are at least two geometric shapes.

Preferably, the two geometric shapes have the same or similar shape while one is located within the other.

Preferably, said at least one line is a virtual line or a line explicitly visible in the final output image.

Preferably, a single line, denoting highlighted character icons, is associated with two geometric shapes.

Preferably, each geometric shape has its own associated line denoting highlighted character icons.

Preferably, there is more than one line arranged at right angle or a different angle with respect to each other.

Preferably, said highlighted character icons are drawn in a color corresponding to color buttons of the controller as assigned.

Preferably, said automatic highlighting is effected by moving said character icons on the respective geometric shape while the line remains stationary Preferably, said automatic highlighting is effected by rotating said line about a center point while the character icons, aligned along the outline of the geometric shape, remain stationary.

Another object of the present invention is a computer program comprising program code means for performing all the steps of the computer-implemented method according to the present invention when said program is run on a computer.

Another object of the present invention is a computer readable medium storing computer-executable instructions performing all the steps of the computer-implemented method according to the present invention when executed on a computer.

BRIEF DESCRIPTION OF THE DRAWINGS

These and other objects of the invention presented herein, are accomplished by providing a system and method for a virtual keyboard. Further details and features of the present invention, its nature and various advantages will become more apparent from the following detailed description of the preferred embodiments shown in a drawing, in which:

FIGS. 4A-7C present examples of GUI views of the virtual keyboard according to the present invention.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DESCRIPTION OF EMBODIMENTS

The system and method will be presented below with reference to an embodiment related to a television Set Top Box (STB). However, it may be implemented in an equivalent manner to other content receiving devices, such as personal computers, portable devices, smartphones, etc. that may be operated using a virtual keyboard.

Figure 1:
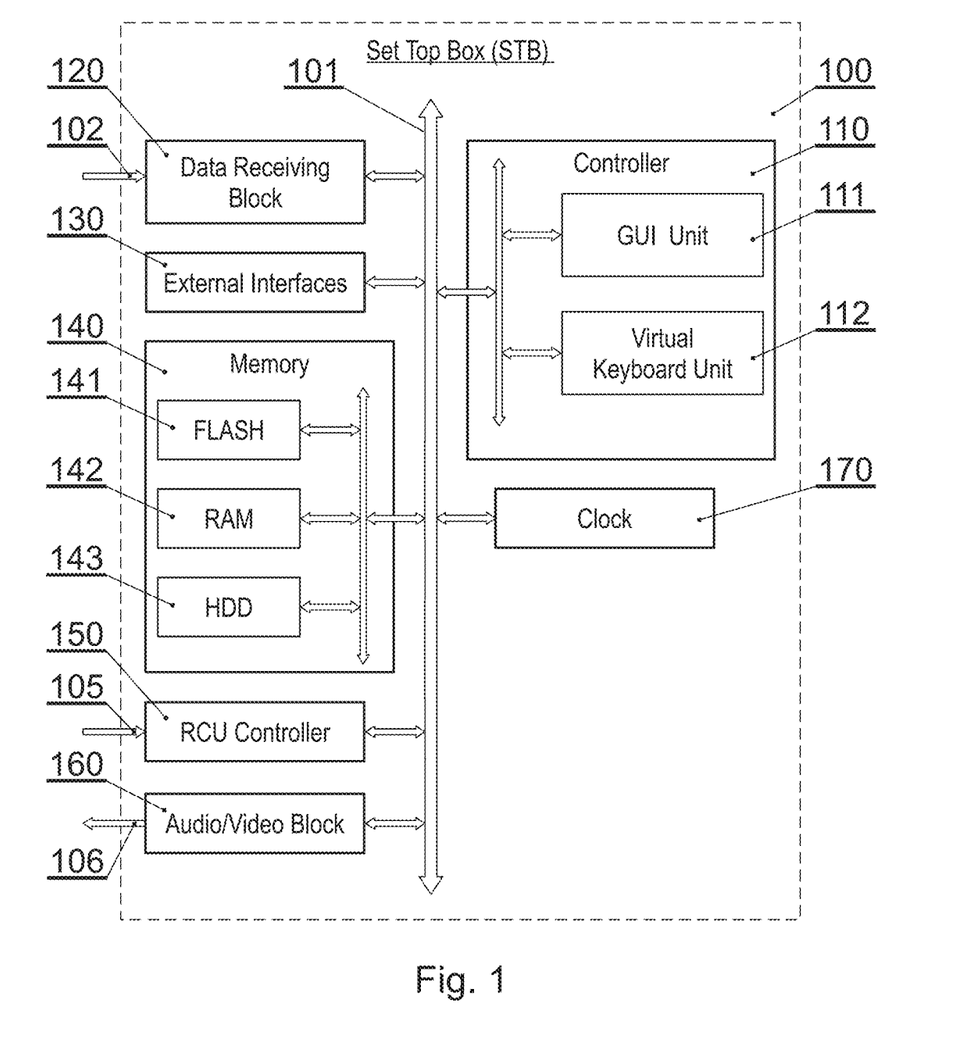
FIG. 1 presents a diagram of the system according to the present invention.

FIG. 1 presents an example of a structure of a Set Top Box (STB). A controller 110 comprises a plurality of units configured to provide the functionality of the system as described herein in accordance with the method of FIG. 3.

A graphical user interface unit 111 is responsible for generating user interface comprising virtual keyboard according to the present invention, which is managed by a virtual keyboard unit 112 responsible for generating and operating said virtual keyboard. Thus, the GUI unit 111 is responsible for any graphical tasks such as generating or drawing objects to be present in the output video signal.

The STB 100 operates utilizing memory blocks 140, that may comprise RAM 142 and/or Flash 141 blocks and/or a hard disk drive (HDD) 143 or another type of mass storage that can be used to store video or other data locally at the STB, but is not essential for its operation. The FLASH memory 141 may store configuration of the virtual keyboard such as its size on a screen, its timing parameters, its graphical parameters as will be presented in details with reference to the following drawings.

A clock module 170 is configured to provide timing data necessary for cooperation of the device units as well as for monitoring relevant times required during virtual keyboard's operation.

A data receiving block 120 is configured to receive downstream data 102, such as video content, from the broadcasting distribution network. The content receiving block 120 (also called a front-end block) may comprise a plurality of tuners (such as satellite, cable, terrestrial or IPTV tuners), wherein one of the tuners receives content to be displayed at the television screen to which the STB is directly connected (e.g. the STB 100 connected to a TV set) and other tuner(s) receive(s) content to be recorded at the HDD 143 while the remaining tuner(s) may be used for predictive channel tuning.

External interfaces 130, such as the Ethernet interface, are configured to communicate, via at least one transmission channel, with the Ethernet (IP) network or the wireless network, in order to receive applications and/or content recommendation data, as well as to transmit user or STB statistic data.

The STB 100 is operable by the user via a remote control unit (RCU) that communicates, typically via an infrared (IR) receiver receiving an IR signal 105, with a RCU controller block 150.

An audio/video block 160 is an example of a content presentation block and configured to decode the received content, convert it to an audio/video format suitable for presentation to the user, and to transmit the converted content via a transmission channel 106 to the TV set to which the STB is directly connected.

All modules of the STB communicate with each other via one or more internal data buses 101.

Figure 2:
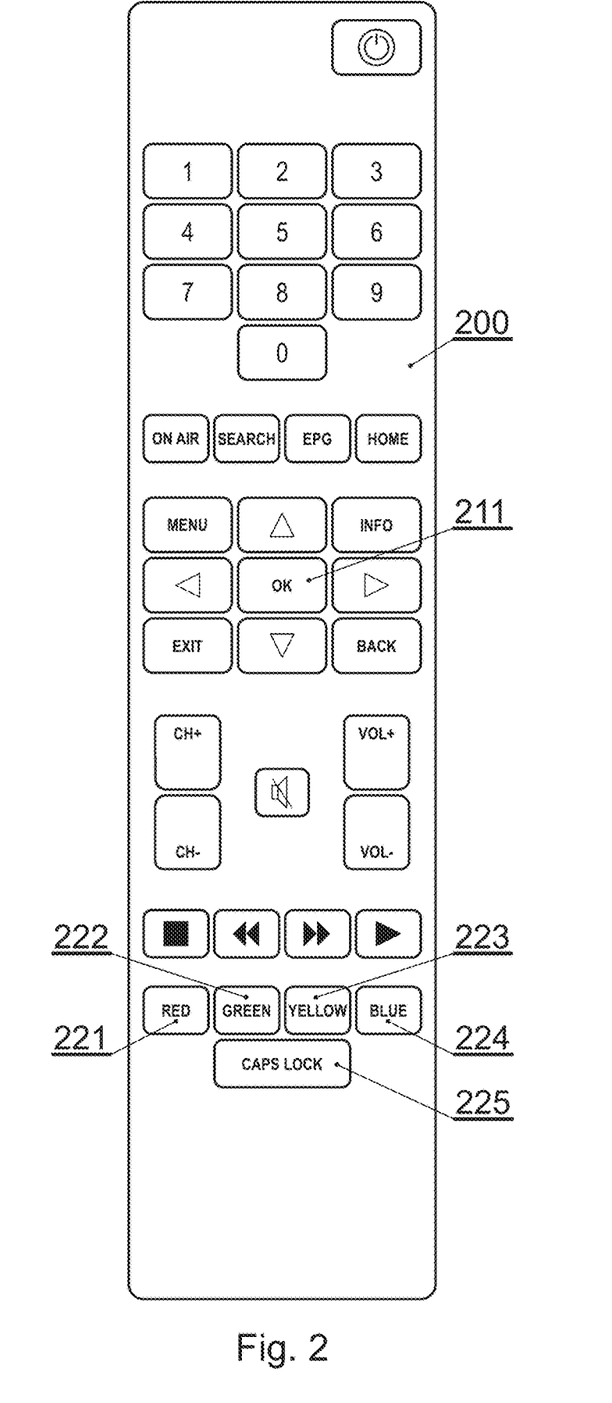
FIG. 2 shows an example of a remote control unit used to operate a virtual keyboard.

FIG. 2 presents an example of an RCU 200 that may be used to operate the virtual keyboard according to the present invention. As is evident, the RCU 200 does not comprise a hardware keyboard and a limited number of keys (211, 221-224) will be used to operate the virtual keyboard according to the present invention.

In particular, in a preferred embodiment only five keys are needed in order to input alphanumeric characters. In some simpler embodiments (as will be shown in the subsequent drawings) only three keys are sufficient to operate the virtual keyboard.

An OK button 211 may accept a complete text input, while one or more pairs of keys select alphanumeric characters of the virtual keyboard. For example, one such pair is RED 221, GREEN 222 while another pair may be YELLOW 223, BLUE 224. The keys 221-224 are typical RCU 200 keys, thus legacy devices may have their software upgraded in order to take advantage of the present invention without a need to replace hardware RCU 200.

In some embodiments a CAPS LOCK 225 key may be made available to a user. Additionally, a key changing the rotation direction (of icons or lines as will be described later) may be present or its function dynamically assigned to e.g. BACK button when user interface is in text editing mode.

Figure 3:
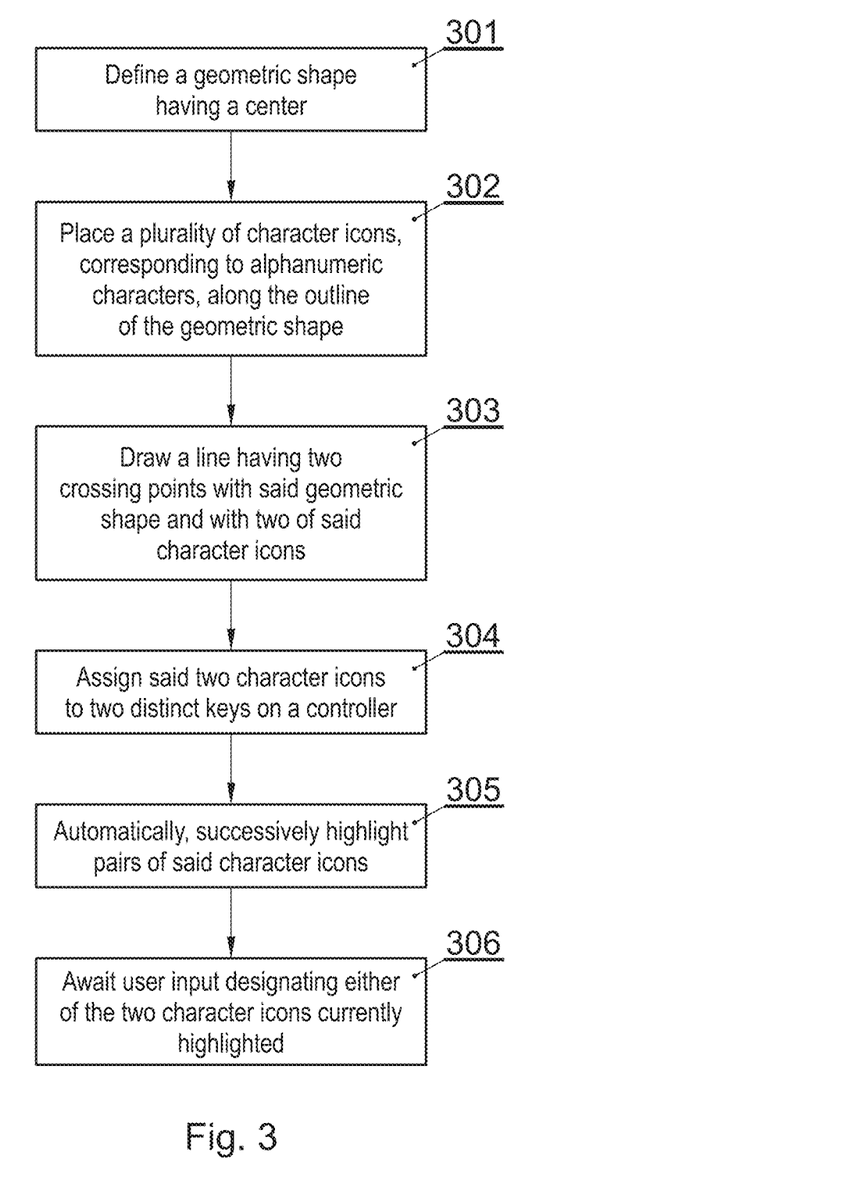
FIG. 3 presents a diagram of the method according to the present invention.

FIG. 3 presents a block diagram of a method according to the present invention. The method generally speaking results in generating a display signal comprising graphical elements that are updated according to user's input. Thus, actions such as drawing refer to generating appropriate pixels in an output image.

The method starts at step 301 from drawing/defining at least one geometric shape, which may or may not be shown on the screen in the final image (for example is present in the final output image of the output GUI signal). Preferably, a closed geometric shape is used, which is a space that is totally enclosed by lines, or unbroken contours. In a preferred embodiment, the closed geometric shape is a convex polygon or a circle or an ellipse. For example, an ellipse may be preferred since it has a center point that is easily determined by a user as well as fits a typical output frame which is a rectangle (e.g. full HD resolution).

As will be shown in the subsequent drawings there may be for example two geometric shapes having the same or similar shape while one in located within or next to the other.

At step 302, along the line defined by the line geometric shape (its outline), a plurality of character icons are placed corresponding to alphanumeric characters, typically used with keyboards. The set of said alphanumeric characters depends on a language selected for the virtual keyboard. The language may be stored as a configuration parameter of the virtual keyboard.

Next, at step 303, at least one line is drawn (i.e. generated in said GUI output signal), crossing (or otherwise adhering, being in proximity or unambiguously designating) said geometric shape, and having at least two crossing points with said at least one geometric shape and with two of said character icons per line. Those character icons become currently selected. Said at least one line may be a virtual line (not shown) or a line explicitly shown to a user.

As will be shown in the subsequent drawings a single line may be associated with two geometric shapes or there may be more than one line, for example one line associated with an outer geometric shape while another line is associated with the inner geometric shape.

In case there are more than one line (for example 2) they may be arranged at right angle or a different angle with respect to each other.

At step 304 said two character icons are assigned to two distinct keys on the controller such as the RCU 200. Preferably, said two character icons are drawn in a color corresponding to color buttons 221-224 as assigned.

Subsequently 305 the system automatically, successively highlights pairs of said character icons. The automatic highlighting obviates a need for a user to navigate among the alphanumeric characters. A time between successive highlighting may be a configuration parameter of the system, such as 0.5 or 1 second.

The highlighting may be for example implemented as moving said alphanumeric character icons on the geometric shape (preferably its outline) while the line remains stationary or rotating said line about a center point while the character icons, aligned along the outline of the geometric shape, remain stationary. Preferably, the center point of the rotation of said line is the same as the center point of said geometric shape.

Lastly 306, the system awaits user's input, designating either of the two character icons currently highlighted (or one of the highlighted icons in general) wherein the input is such that it directly designates one of the two highlighted character icons.

In one embodiment, character icons may correspond to more than one alphanumeric character where a selection of a particular alphanumeric character is effected taking into account duration of keypress of an associated key. For example, an icon may be associated with a small 'a' and a capital 'A' wherein a short pressing of an associated key select 'a' while a long pressing of the same key selects 'A' which may be further indicated on the virtual keyboard's GUI (for example with a suitable highlight).

FIGS. 4A-7C present examples of GUI views of the virtual keyboard according to the present invention.

Figure 4A:
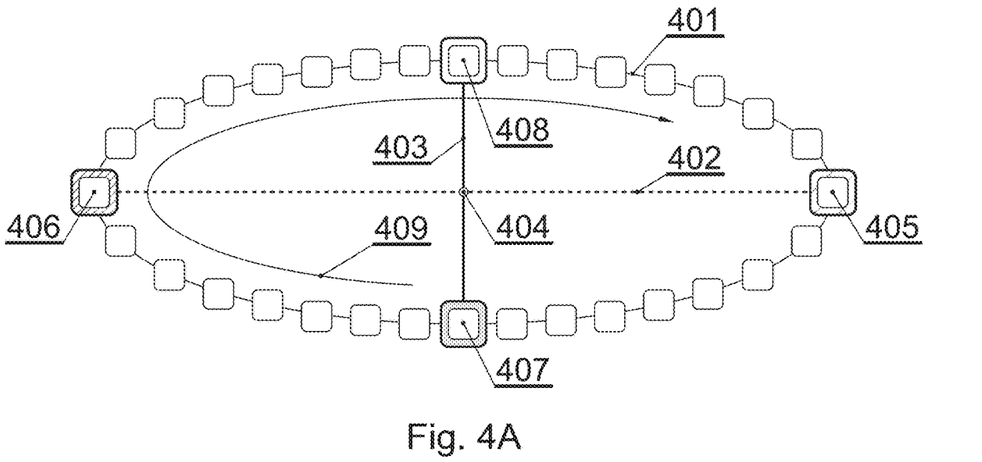

In FIG. 4A a geometric shape in a form of an ellipse 401 is shown together with two straight lines 402, 403 crossing said ellipse 401 via its center 404. The first line 402 passes via two character icons 405, 406 which are highlighted (for example with a corresponding color as an assigned color key 221-224 on the RCU 200). The second line 403 passes via two character icons 407, 408 which are highlighted (for example with a corresponding color as an assigned color key 221-224 on the RCU 200). In this example the character icons are shifted clockwise 409 while the lines 402, 403 remain stationary. Thus, successive character icons are selected and a user is aware which character icons will be highlighted for selection in the next steps.

Figure 4B:
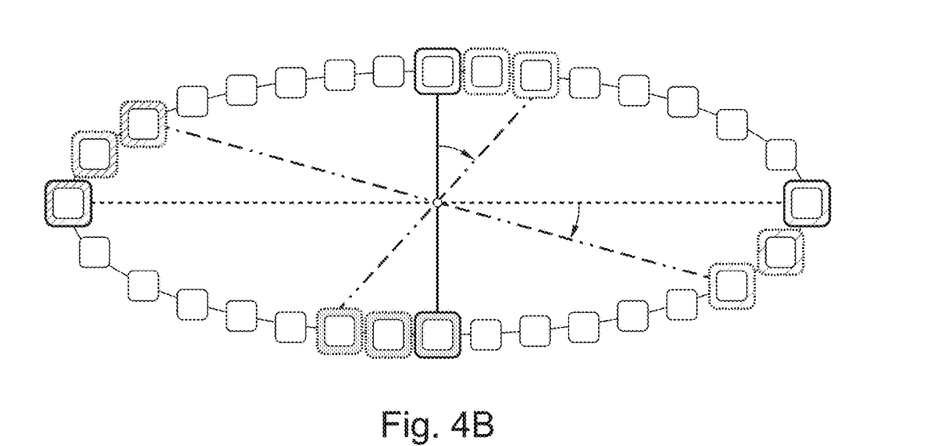

FIG. 4B is similar to FIG. 4A but in this case the lines move clockwise 409 about the center point 404 while the character icons remain stationary. Clearly, a counterclockwise rotation may be applied while a direction of rotation may be a configuration parameter of the system.

In certain embodiments of the present invention there may be another key on the controller 200 that allows a user to switch the direction of the automatic, successive highlighting of the character icons.

Figure 5A:
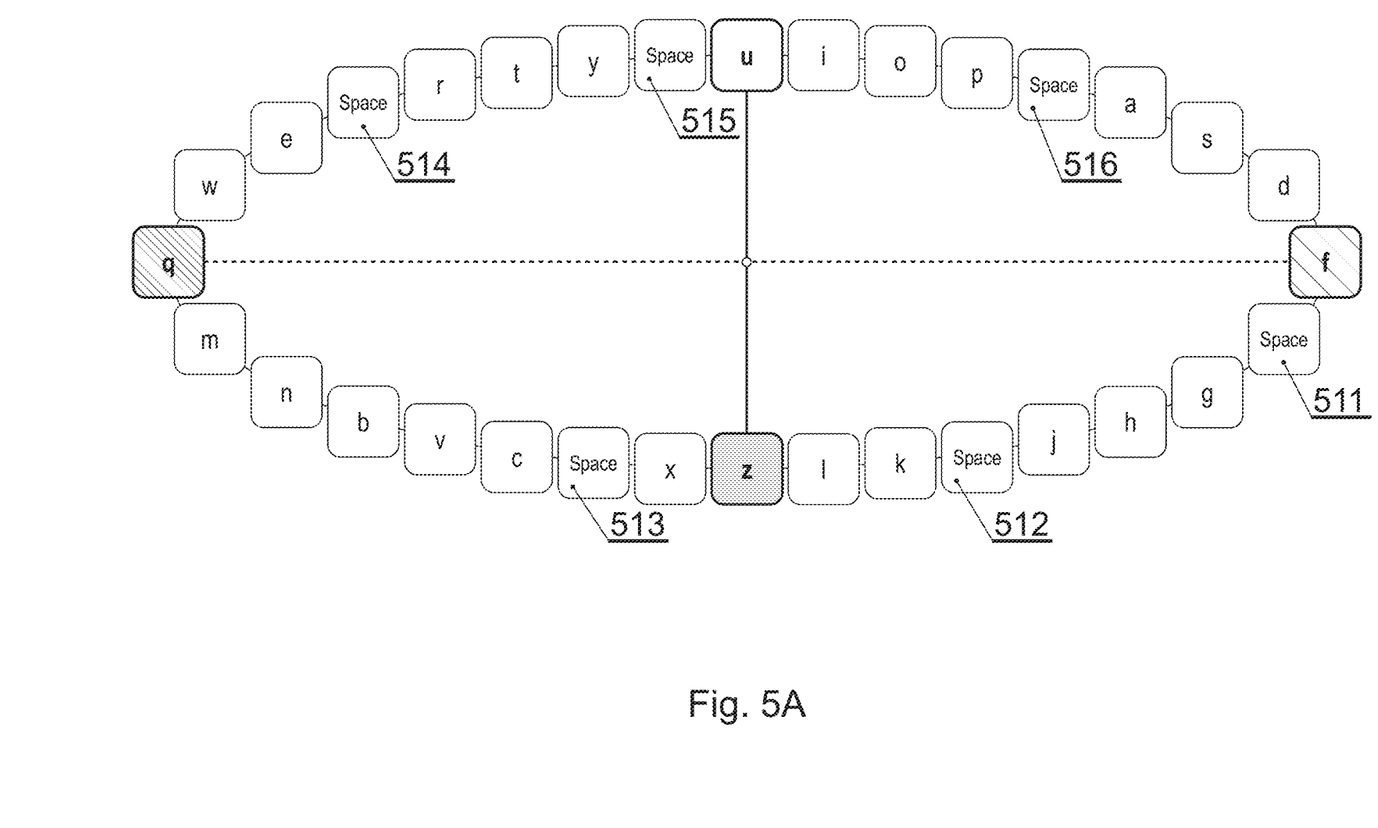

FIG. 5A presents an example of alphanumeric character icons wherein there are cases when frequently used characters, such as a space 511-516, are present more frequently on the list of characters.

In this case, a user may select one of four highlighted characters: u or z or q or f, that may be highlighted using respective colors of the RCU keys 221-224.

Figure 5B:
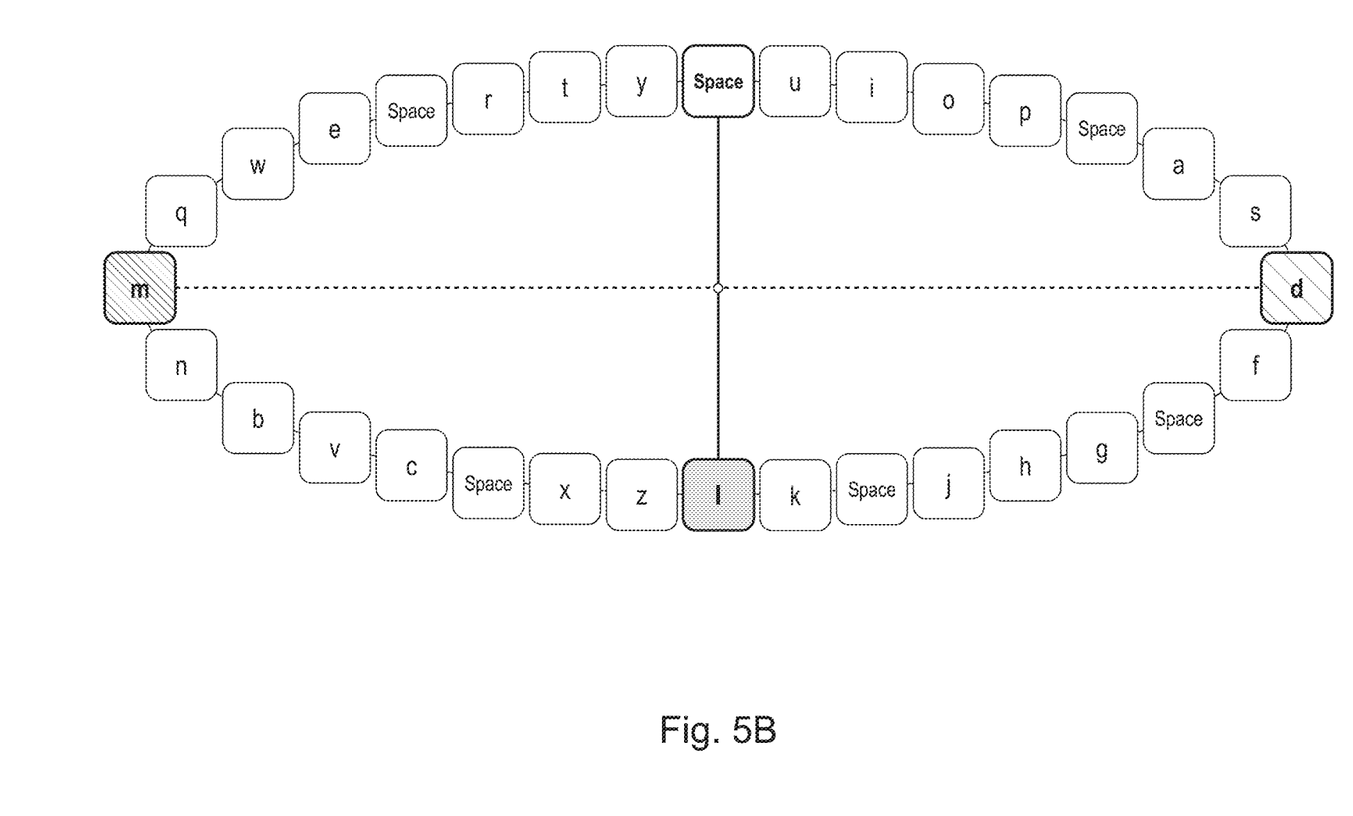

FIG. 5B shows the case of FIG. 5A when the character icons have been shifted clockwise and the user may select one of the four highlighted characters: space or l or m or d, that may be highlighted using respective colors of the RCU keys 221-224.

Figure 5C:
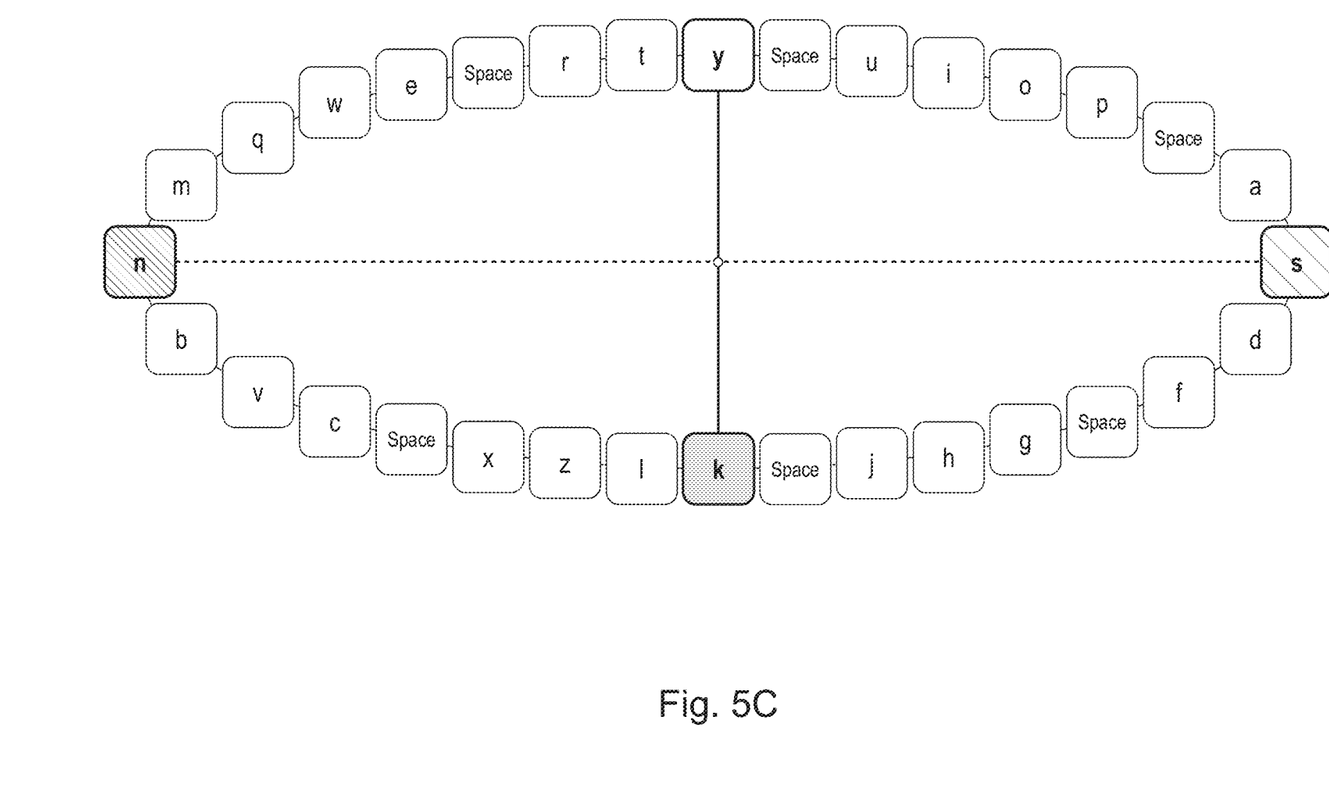

Similarly, FIG. 5C shows the case of FIG. 5B when the character icons have been shifted clockwise and the user may select one of four highlighted characters: y or k or n or s, that may be highlighted by using respective colors of the RCU keys 221-224.

Figure 6A:
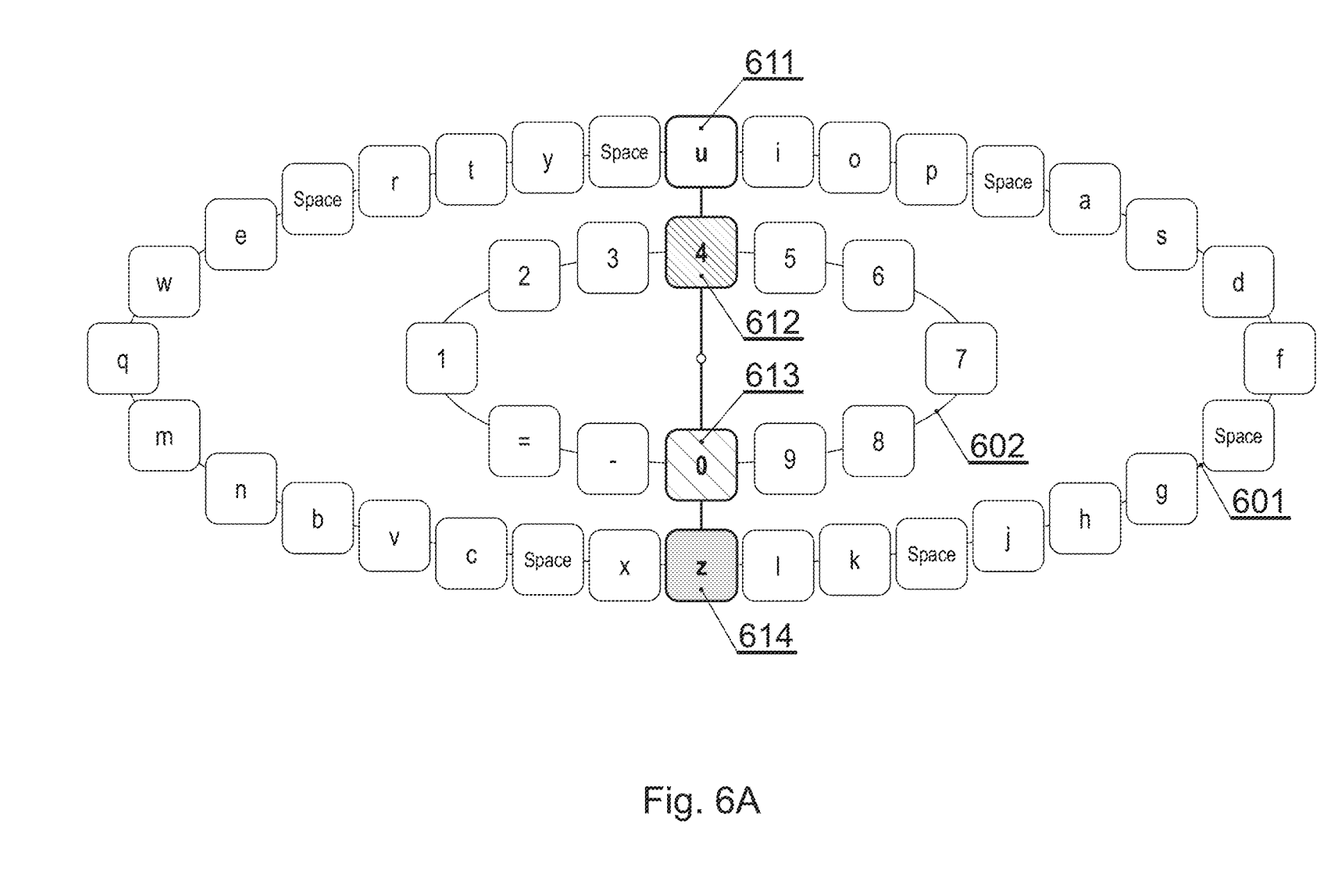

FIG. 6A show an embodiment where two geometric shapes are shown i.e. an inner 602 geometric shape and an outer 601 geometric shape. The geometric shapes need not be the same but from a user's perspective it is more user-friendly to have the same geometric shape applied with a different size. This also applies to the center of the geometric shapes which need not have the same center but it is preferred that they do have the same center point.

This embodiment allows, for example, to put digits and special signs or most frequently used characters on the inner geometric shape (its outline).

In this case a single line is used to highlight pairs of character icons on both geometric shapes i.e. inner and outer. Naturally, these four distinct characters (in this case u, 4, 0 and z (611-614)) are mapped to four distinct keys 221-224 of the controller 200.

Figure 6B:
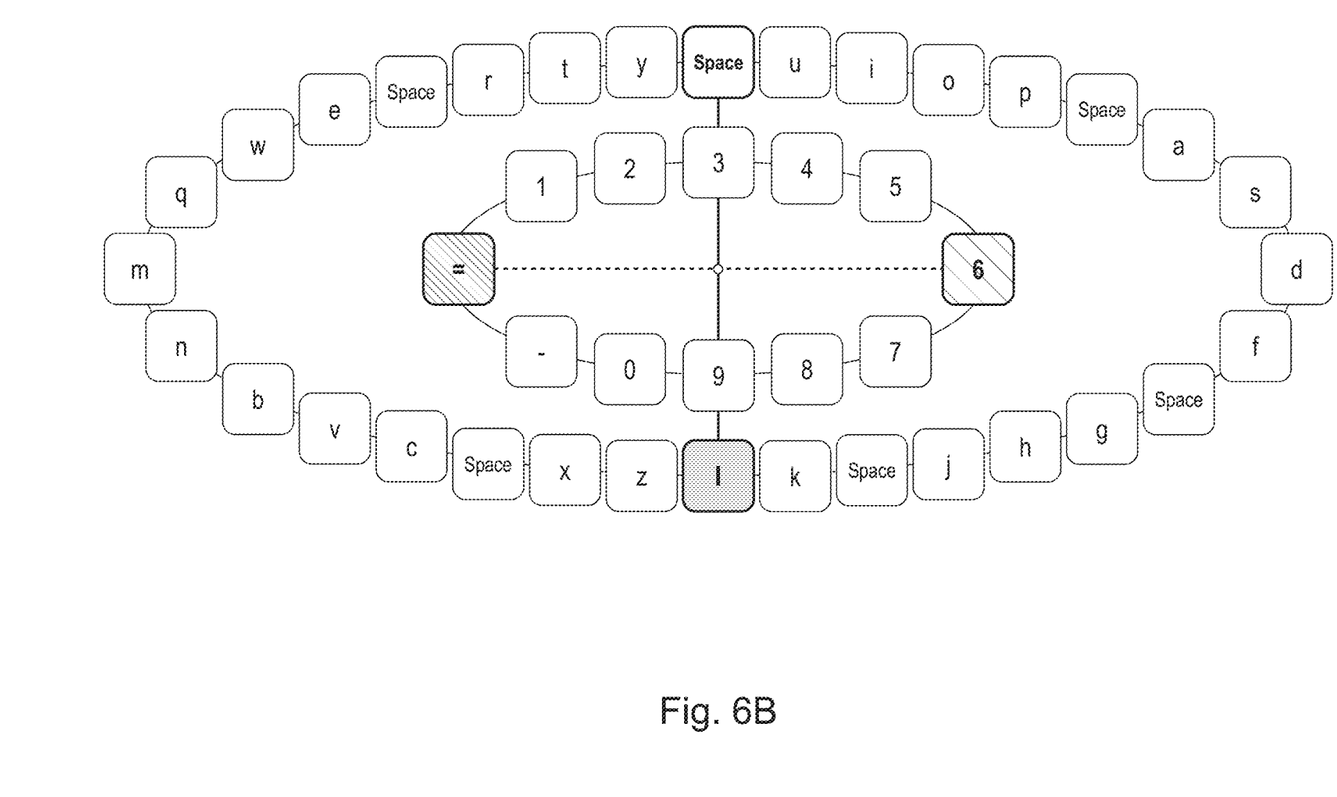

FIG. 6B depicts a case similar to FIG. 6A but with two distinct lines drawn at an angle with respect to each other. This angle need not be a right angle as shown in the figure.

Further, the vertical line and the horizontal line of FIG. 6B need not rotate at the same speed. For example if the inner geometric shape comprises more frequently used characters, its associated line (in this case horizontal) may highlight successive character icons with a higher frequency that in case of the outer geometric shape and its associated line.

Depending on the shape(s) of respective geometric figures, it may happen that a line crosses more than two characters on one figure. In such cases it is preferred to keep only the latest icon highlighted. For example, the vertical line in FIG. 6B may cross icons '1' and '2' as well as '7' and '8'. In such a case, taking into account a direction of rotation (for example clockwise), the highlighting of '2' removes the highlight from '1' and similarly highlighting of '8' removes a highlight from '7'.

In yet another embodiment of the present invention there may be at least two geometric shapes but not arranged one within the other (as shown in FIG. 6A), but rather next to each other. A side by side arrangement may be defined where there are two or more geometric shapes, each being associated with its line used for highlighting respective character icons as shown for example in FIG. 6C.

Figure 6C:
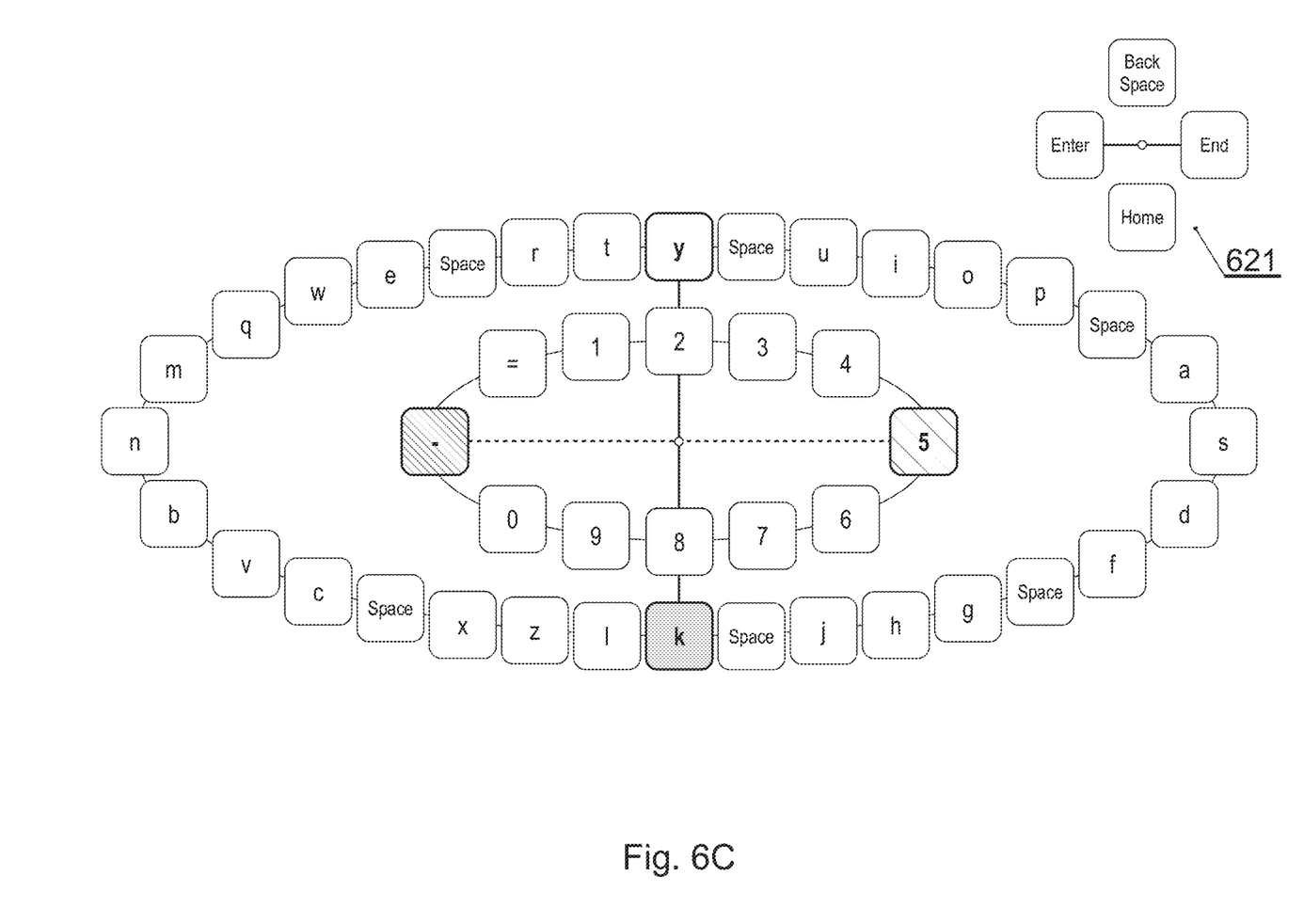

Further, the two or more geometric shapes may have different sizes 621 so that some of them will rotate fully within a shorter time than the other.

Figure 7A:
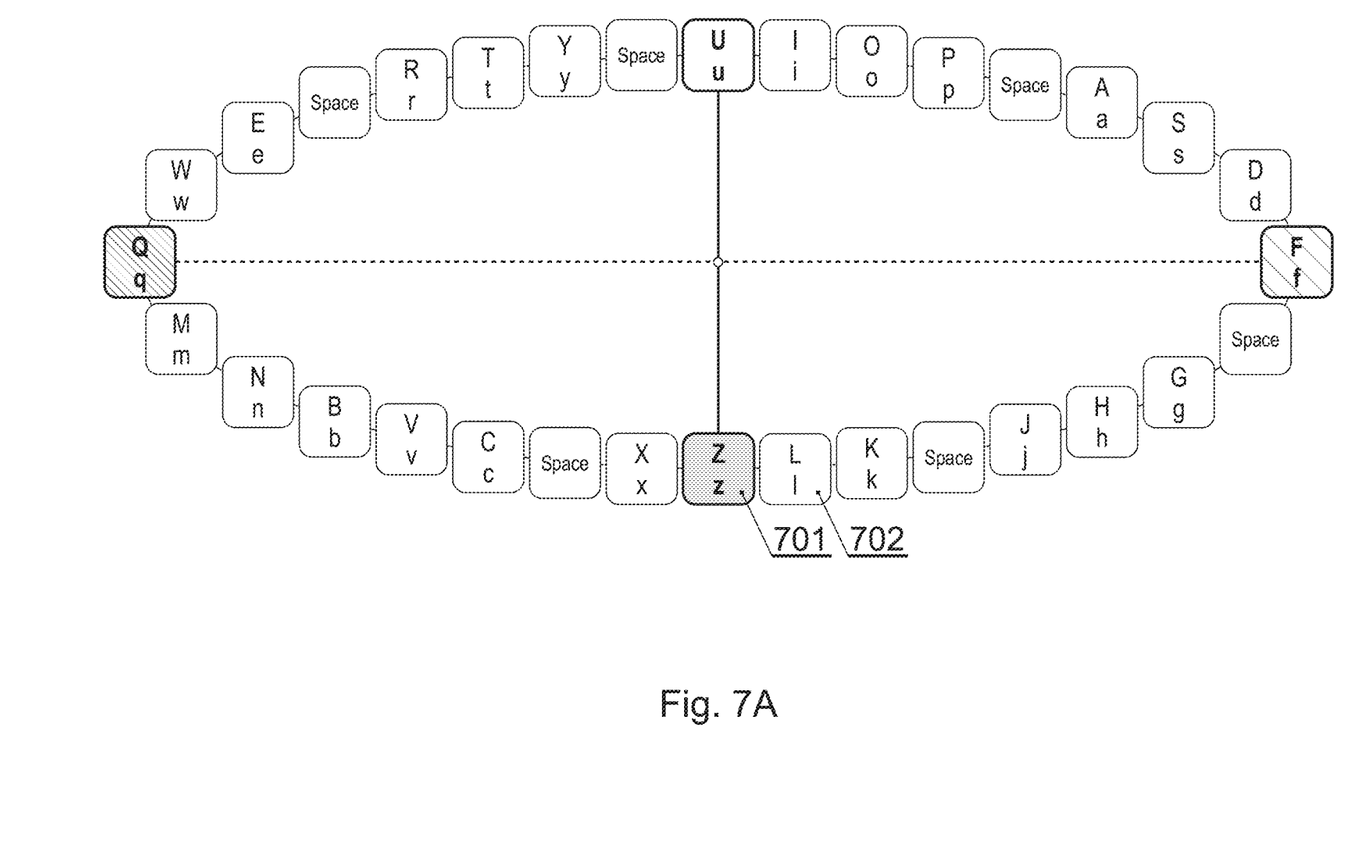

FIG. 7A presents an embodiment of the present invention wherein at least some of the characters' icons 701, 702 comprise two associated characters, for example a small letter and a capital letter.

In order to select either of the two associated characters a key-press-time may be taken into account. For example, when a user holds an associated key 221-224 for a time which is below a predefined threshold, the first of the two alphanumeric highlighted characters is selected while when the time which is above a predefined threshold, the second of the two highlighted alphanumeric characters is selected.

Figure 7B:
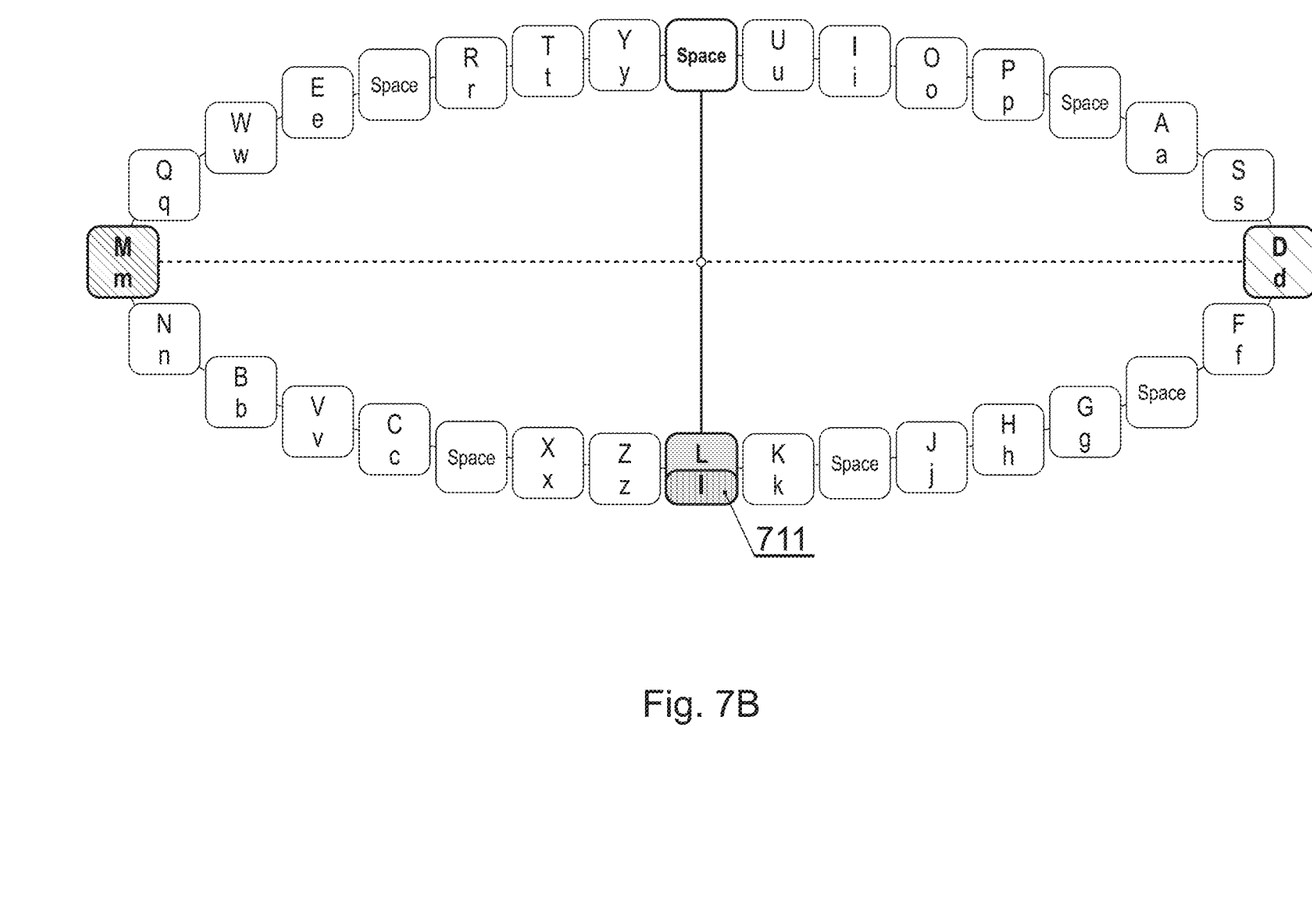

FIG. 7B shows the case of FIG. 7A when the character icons have been shifted clockwise and the user may select one of four highlighted characters: space or (l, L) or (m, M) or (d, D), that may be highlighted for selection via respective colors of the RCU keys 221-224.

In this case a user has pressed a key associated with the (l, L) character icon and the keypress was below the predefined threshold thereby selecting and inputting the l letter 711.

Figure 7C:
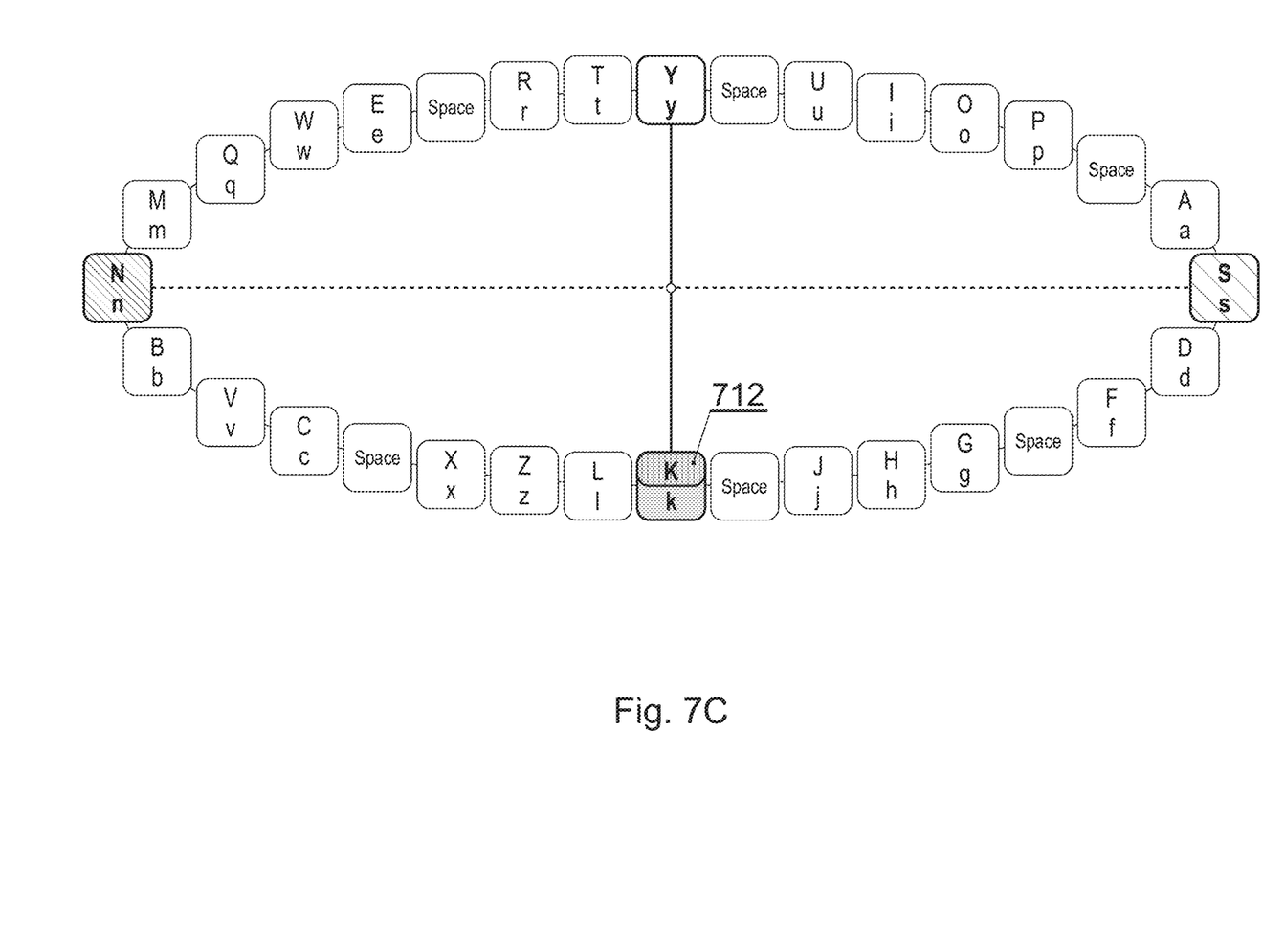

Similarly, FIG. 7C shows the case of FIG. 7B when the character icons have been shifted clockwise and the user may select one of four highlighted characters: (y, Y) or (k, K) or (n, N) or (s, S), that may be highlighted for selection by using respective colors of the RCU keys 221-224. For example, the character icon (k, K) is generated with a green background and associated with a green key on the controller 200.

In this case a user has pressed a key associated with the (k, K) character icon and the keypress was above the predefined threshold thereby selecting and inputting the K letter 712.

As an option, there may be present a characters use monitoring system determining most frequently used character icons. Such icons may then be rearranged on the outlines of said geometric shapes, especially when there is more than one geometric shape. For example, in case of the arrangement of FIG. 6A the most frequently used characters may be moved to the inner geometric shape 602 while the remaining characters are presented on the outer geometric shape 601.

The present invention improves speed in text input using virtual keyboards wherein a user is able to select a character from a designated subset of characters and wherein said selection of characters subset is successively changed. Therefore, the invention provides a useful, concrete and tangible result.

The solution presented herein is applicable in user interfaces, especially of mobile devices and relates to processing alphanumeric characters input. Thus, the machine or transformation test is fulfilled and that the idea is not abstract.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system".

Furthermore, the present invention may take the form of a computer program product embodied in any tangible medium of expression having computer usable program code embodied in the medium.

It can be easily recognized, by one skilled in the art, that the aforementioned method for a virtual keyboard may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. Method for a virtual keyboard, the method being characterized in that it comprises the steps of:
   defining (301) at least one geometric shape;
   placing (302), along the outline of the geometric shape, a plurality of character icons corresponding to alphanumeric characters;
   generating (303), at least one line, crossing said geometric shape, and having at least two crossing points with said at least one geometric shape and with two of its character icons per line, which are thereby designated as currently highlighted character icons;
   assigning (304) said two character icons to two distinct keys on a controller (200);
   automatically, successively (305), simultaneously highlighting pairs of said character icons by rotating said line about a center point while the character icons, aligned along the outline of the geometric shape, remain stationary;
   awaiting (306) a user input designating either of the two character icons currently highlighted.

2. The method according to claim 1 wherein said geometric shape is present in the final output image.

3. The method according to claim 1 wherein said geometric shape is a closed geometric shape, which is a space that is totally enclosed by lines, or unbroken contours.

4. The method according to claim 3 wherein the closed geometric shape is a convex polygon or a circle or an ellipse.

5. The method according to claim 1 wherein there are at least two geometric shapes.

6. The method according to claim 5 wherein the two geometric shapes have the same or similar shape while one is located within the other.

7. The method according to claim 1 wherein said at least one line is a virtual line or a line explicitly visible in the final output image.

8. The method according to claim 5 wherein a single line, denoting highlighted character icons, is associated with two geometric shapes.

9. The method according to claim 5 wherein each geometric shape has its own associated line denoting highlighted character icons.

10. The method according to claim 9 wherein there is more than one line arranged at right angle or a different angle with respect to each other.

11. The method according to claim 1 wherein said highlighted character icons are drawn in a color corresponding to color buttons (221-224) of the controller (200) as assigned.

12. A method for a virtual keyboard, the method being characterized in that it comprises the steps of:
- defining (301) at least one geometric shape;
- placing (302), along the outline of the geometric shape, a plurality of character icons corresponding to alphanumeric characters;
- generating (303), at least one line, crossing said geometric shape, and having at least two crossing points with said at least one geometric shape and with two of its character icons per line, which are there designated as currently highlighted character icons;
- assigning (304) said two character icons to two distinct keys on a controller (200);
- automatically, successively (305), simultaneously highlighting pairs of said character icons by moving said character icons on the respective geometric shape while the line remains stationary.

13. A computer readable non-transitory storage medium having computer-executable instructions embodied thereon, the computer-executable instructions executable by a computer processor to cause the compute processor to perform a method, the method comprising:
- defining (301) at least one geometric shape;
- placing (302), along the outline of the geometric shape, a plurality of character icons corresponding, to alphanumeric characters;
- generating (303), at least one line, crossing said geometric shape, and having at least two crossing points with said at least one geometric shape and with two of its character icons per line, which are thereby designated as currently highlighted character icons;
- assigning (304) two character icons to two distinct keys on a controller (200);
- automatically, successively (305), simultaneously highlighting pairs of said character icons by rotating said line about a center point while the character icons, aligned along the outline of the geometric shape remain stationary;
- awaiting (306) a user input designating either of the two character icons currently highlighted.

* * * * *